United States Patent

Silver

[15] 3,642,331
[45] Feb. 15, 1972

[54] HYBRID BEARING
[72] Inventor: Alexander Silver, Tarzana, Calif.
[73] Assignee: The Garrett Corporation, Los Angeles, Calif.
[22] Filed: Dec. 12, 1969
[21] Appl. No.: 884,395

[52] U.S. Cl. ........................................................308/35
[51] Int. Cl. ................................................F16c 21/00
[58] Field of Search ..........................308/35, 9, 122

[56] References Cited

UNITED STATES PATENTS

| | | | |
|---|---|---|---|
| 2,969,680 | 1/1961 | Linn et al. | 308/35 |
| 3,305,280 | 2/1967 | Peterson | 308/35 |
| 3,382,014 | 5/1968 | Marley | 308/9 |
| 3,434,761 | 3/1969 | Marley | 308/9 |

Primary Examiner—Martin P. Schwadron
Assistant Examiner—Frank Susko
Attorney—Albert J. Miller and John N. Hazelwood

[57] ABSTRACT

A hybrid bearing which includes a rolling contact bearing for startup and low-speed operation, and a hydrodynamic foil bearing for high-speed operation. The hydrodynamic foil may be included between the shaft and the inner race of the rolling contact bearing or between the outer race of the rolling contact bearing and the bushing. A clutch may be included to provide the switch over between the low-speed rolling contact and the high-speed hydrodynamic foil of the hybrid bearing.

29 Claims, 2 Drawing Figures

PATENTED FEB 15 1972  3,642,331

INVENTOR.
ALEXANDER SILVER
BY
Albert J. Miller
ATTORNEY

HYBRID BEARING

BACKGROUND OF THE INVENTION

Rolling contact bearings, that is, relatively mobile bearing surfaces supported for movement therebetween by intervening rollers, balls or other similar mechanical antifriction means, have been used extensively for many years in varying applications. With the advent of higher speed and higher temperature machinery, such rolling contact bearings have been increasingly replaced by other bearing designs. These rolling contact bearings are not suitable for such extreme applications because of lubrication problems, vibrations and other similar limitations. They remain, however, in widespread use in low-speed, low-temperature applications.

For high-speed applications, fluid bearings are now used extensively. These fluid bearings generally comprise two elements, a fixed element and a movable element with a predetermined spacing therebetween. The spacing is filled with a fluid such as air, which, under dynamic conditions, forms a supporting wedge to provide sufficient support of a load by preventing contact between the movable and stationary elements.

More recently, improved fluid bearings, particularly gas bearings of the hydrodynamic type, have been developed by providing foils in the space between the bearing elements. Such foils are generally thin sheets of a thickness such that they are deflected by hydrodynamic film forces between the adjacent bearing surfaces and the foils. The foils enhance the hydrodynamic characteristics of the gas bearings and also provide improved operation under extreme load conditions when normal bearing failure might otherwise occur. Additionally, foil segments are provided for the added advantage of accommodating eccentricity of the movable element and of providing a cushion and dampening effect. This reduces or eliminates the synchronous whirl and half speed whirl instability commonly associated with hydrodynamic bearings. The foil segments are resilient and move under dynamic conditions in response to the pressure created by the relative motion of the bearing elements. An example of a foil type bearing is illustrated in U.S. Pat. No. 3,215,480, assigned to the assignee of the present invention.

These hydrodynamic foil bearings, while quite suitable for high-speed operation, are not suitable for low-speed operation such as encountered during startup and coast-down or in starting from the rest condition of 0 r.p.m. They are incapable of carrying the normal dynamic bearing loads at low speeds and are subject to severe wear if operated at low speeds. This is understandable since in a typical hydrodynamic gas bearing a suitable lubrication of the bearing surfaces depends upon the effect of viscous shear which draws air in between the bearing surfaces which are loaded by the bearing load. When the relative rotation of the bearing surfaces drops below some minimum level, the lubricating gas is no longer drawn into the region between the loaded bearing surfaces and the surfaces come into contact and may suffer damage by scoring or overheating or, at the very least, bearing drag is increased. The same condition exists during startup. While the use of foils alleviates, to some extent, the problems of bearing surface contact encountered during startup and coast-down, the problem is not entirely eliminated. The foils, being resilient, are better able to withstand the effect of contacts but there are still substantial forces imposed upon them which have a tendency to tear them or even yank them loose from their positioning arrangements.

SUMMARY OF THE INVENTION

The invention is directed to a hybrid bearing which takes advantage of the desirable low-speed characteristics of a rolling contact bearing and the desirable high-speed characteristics of a hydrodynamic foil bearing. In one embodiment, the rolling contact bearing, such as a ball or roller bearing, is affixed to the interior of the stationary bearing support structure or bushing and a hydrodynamic foil bearing is positioned between the inner race of the rolling contact bearing and the rotating member or shaft. In another embodiment, the rolling contact bearing is affixed to the rotating member and the hydrodynamic foil bearing is inserted between the outer race of the rolling contact bearing and the stationary member. In order to effect the transition between the low-speed rolling contact bearing and the high-speed hydrodynamic foil bearing, a clutch to prevent relative rotation between the inner and outer races of the rolling contact bearing above a predetermined rotational speed may be provided.

DESCRIPTION OF THE PREFERRED EMBODIMENTS

Figure 1:
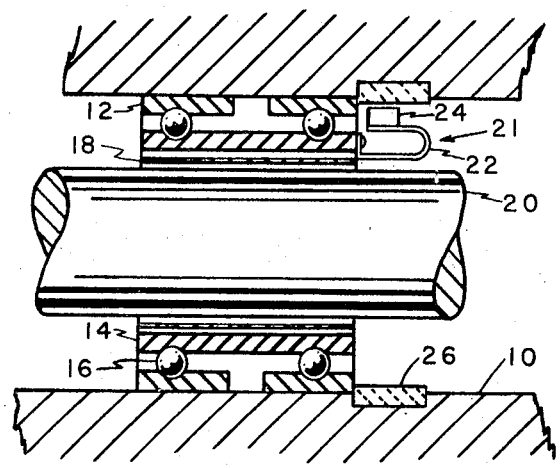
FIG. 1 is a sectional view of the hybrid bearing of the present invention in which the hydrodynamic foil bearing is positioned between the inner race of the rolling contact bearing and the shaft.

As shown in FIG. 1, the hybrid bearing of the present invention is mounted within a support structure such as bushing 10. The outer race 12 of the rolling contact bearing, such as a ball or roller bearing, is affixed to the interior of the bushing 10. The inner race 14 is separated from the outer race 12 by rolling antifriction members such as rollers or balls 16. Hydrodynamic foils 18 are attached to the interior of the inner race 14 by conventional foil mountings such as the pins illustrated in U.S. Pat. No. 3,366,427. The inner race 14 may be grooved to accept these pins. The hydrodynamic foil 18 extends around the rotating shaft 20.

At the start of rotation of the shaft 20, the shaft will rotate on the rolling contact bearing because of the higher friction of the normally preloaded foil bearing on the shaft. In other words, the hydrodynamic foil 18 and the inner race 14 of the rolling contact bearing will rotate with the shaft 20 and the outer race 12 will be affixed to the bushing 10. As greater speeds are achieved, the friction of the rolling contact bearing will increase to the point where the foil 18 will break loose from the shaft 20 and become airborne. At airborne speeds, the friction of the hydrodynamic foil bearing is much less than that of the rolling contact bearing.

If it is desired to trigger this demarcation between rolling contact bearings and hydrodynamic foil bearings, or if the hydrodynamic foil bearings are unusually stiff, a clutch 21 may be utilized. For example, a centrifugal clutch, comprising a weight 24 supported by a U-shaped flexure 22 mounted on the inner race 14 may be employed. A brake pad 26 is positioned on the interior of the bushing 10 opposite the weight 24. The weight 24 and stiffness of the flexure 22 can be designed to accomplish this triggering at any desired predetermined value. The centrifugal clutch 21, at high speeds, will cause the inner race 14 of the rolling contact bearing to cease rotating with the shaft 20 and enable the hydrodynamic foil 18 to become airborne. Alternately, the clutch 21 may be actuated by an externally mounted speed sensor and solenoid.

Figure 2:
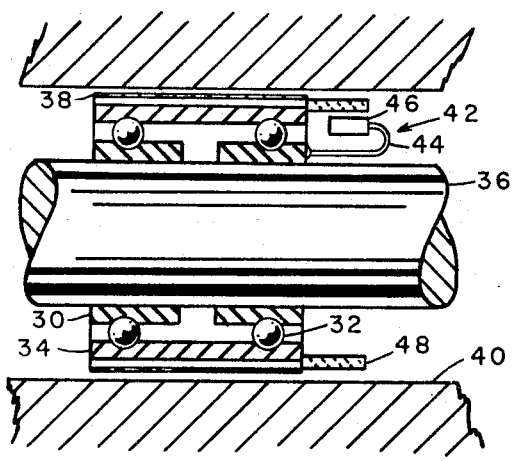
FIG. 2 is a sectional view of an alternate embodiment of the hybrid bearing in which the hydrodynamic foil bearing is positioned between the outer race of the rolling contact bearing and the bushing.

In the alternate embodiment of FIG. 2, the inner race 30, rolling members 32 and outer race 34 are mounted upon shaft 36. The hydrodynamic foil 38 is positioned between the outer race 34 and bushing 40. The centrifugal clutch 42 would comprise a flexure 44 mounted on the inner race 30 and include weight 46 positioned adjacent brake pad 48 which is mounted on the outer race 34.

The operation of this alternate embodiment is essentially the same as that of FIG. 1. At low speeds, the inner race 30 of the rolling contact bearing rotates with the shaft 36 while the outer race 34 and foil 38 remains stationary with the bushing 40. At a preset rotational shaft speed, the clutch 42 will engage the outer race 34 on the surrounding brake band or pad 38, thus accelerating the outer race 34 so that the combined momentum breaks loose the outer race 34 from the hydrodynamic foil 38. In this manner the combined shaft and rolling contact bearing becomes airborne. With sufficient speed, the clutch may not be necessary and the shaft and rolling contact bearing will become airborne without it. Unless, however, the outer race 34 is carried around at the same speed as the inner race 30, some self-acting load capacity will be lost.

Accordingly, a rolling contact bearing is used to handle the higher starting friction loads and wear, while the hydrodynamic foil bearing provides reduced friction at high speeds. Since the rolling contact bearings are used only at low speeds, they can be relatively simple and inexpensive. Likewise, severe requirements are not imposed upon the hydrodynamic foils since they only operate at the high speeds for which they are more suited. While the invention has been described in detail as having a stationary bushing and a rotating shaft, it should be recognized that the shaft may be fixed and the collar or bushing rotated.

In the first embodiment of FIG. 1 the shaft can be made smaller than a comparable shaft for the second embodiment. Also, the first embodiment should be less sensitive to unbalance and vibration in permitting higher preload to be placed upon the foils. The second embodiment does however, permit the utilization of a larger air bearing diameter than the first embodiment.

This hybrid bearing can be applied to any application in which hydrodynamic foil bearings are presently utilized to extend the wear life of such bearings. It is particularly appropriate for large high-speed turbomachinery which may be subject to overload or which requires a low starting friction.

While specific embodiments of the invention have been illustrated and described, it is to be understood that these embodiments are provided by way of example only and that the invention is not to be construed as being limited thereto but only by the proper scope of the following claims.

What I claim is:

1. A hybrid bearing comprising:
    a rolling contact bearing element comprising a concentrically arranged inner race and outer race and a plurality of rolling members disposed in rolling contact relation between said inner and outer races; and
    a hydrodynamic foil bearing element operably associated with said rolling contact bearing element, said hydrodynamic foil bearing element comprising a plurality of resilient bearing foils disposed around the outer race of said rolling contact bearing element and substantially preventing rolling contact bearing action when said hydrodynamic foil bearing element is activated—has been inserted.

2. A hybrid bearing comprising:
    a rolling contact bearing element comprising a concentrically arranged inner race and outer race and a plurality of rolling members disposed in rolling contact relation between said inner and outer races; and
    a hydrodynamic foil bearing element operably associated with said rolling contact bearing element, said hydrodynamic foil bearing element comprising a plurality of resilient bearing foils disposed within the inner race of said rolling contact bearing element and substantially preventing rolling contact bearing action when said hydrodynamic foil bearing element is activated—has been inserted.

3. A hybrid bearing comprising:
    a pair of members arranged for relative movement with respect to one another, one of the members being adapted to support the other;
    a rolling contact bearing element positioned between said pair of members; and
    a hydrodynamic foil bearing element including a plurality of resilient bearing foils positioned between said rolling contact bearing element and one of said pair of members and substantially preventing rolling contact bearing action above a certain relative movement between said members.

4. A hybrid bearing comprising:
    a pair of members arranged for relative movement with respect to one another, one of the members being adapted to support the other;
    a rolling contact bearing element positioned between said pair of members;
    a foil bearing element positioned between said rolling contact bearing element and one of said pair of members; and
    clutch means operably associated with said rolling contact bearing element to deactivate said rolling contact bearing element and to activate said foil bearing element above a predetermined relative movement between said pair of members.

5. The hybrid bearing of claim 3 wherein said plurality of resilient bearing foils are preloaded to prevent activation of said hydrodynamic foil bearing below a predetermined relative movement between said pair of members.

6. The hybrid bearing of claim 3 wherein said pair of members comprise a shaft and a bushing and said rolling contact bearing element comprises a concentrically arranged inner race and outer race and a plurality of rolling members disposed between said inner race and said outer race in a rolling contact relation.

7. The hybrid bearing of claim 6 wherein said shaft is stationary and said bushing is rotatable.

8. The hybrid bearing of claim 6 wherein said plurality of resilient bearing foils are disposed between the shaft and the inner race of said rolling contact bearing element.

9. The hybrid bearing of claim 6 wherein said plurality of resilient bearing foils are disposed between the bushing and the outer race of said rolling contact bearing element.

10. A hybrid bearing comprising:
    a bearing support member having an opening to receive a rotating shaft;
    a rolling contact bearing element mounted within the shaft receiving opening in said bearing support member, said rolling contact bearing element including an outer race, an inner race, and a rolling member positioned between said inner race and said outer race in a rolling contact relation; and
    a hydrodynamic foil bearing element including a plurality of resilient bearing foils mounted within the inner race of said rolling contact bearing element and substantially preventing rolling contact bearing action when said hydrodynamic foil bearing element is activated—has been inserted.

11. A hybrid bearing comprising:
    a bearing support member having an opening to receive a rotating shaft;
    a rolling contact bearing element mounted within the shaft receiving opening in said bearing support member, said rolling contact bearing element including an outer race, and inner race, and a rolling member positioned between said inner race and said outer race in a rolling contact relation;
    a foil bearing element mounted within the inner race of said rolling contact bearing element; and
    clutch means operably associated with said rolling contact bearing element to prevent relative rotation of the inner race with respect to the outer race above a predetermined shaft rotational speed.

12. The hybrid bearing of claim 11 wherein said clutch means is centrifugally actuated.

13. The hybrid bearing of claim 12 wherein said centrifugally actuated clutch means comprises a flexible member mounted upon the inner race of said rolling contact bearing element, a brake pad mounted within the shaft receiving opening, and a weight mounted upon said flexible member to contact said brake pad above a predetermined shaft rotational speed.

14. The hybrid bearing of claim 13 wherein said clutch means includes means to adjust said clutch means to be actuated at varying predetermined shaft rotational speeds.

15. A hybrid bearing comprising:
a bearing support member having an opening to receive a rotating shaft;
a rotatable shaft received within the opening in said bearing support member;
a rolling contact bearing element mounted upon said rotatable shaft within the shaft receiving opening in said bearing support member, said rolling contact bearing element including an outer race, an inner race, and a rolling member positioned between said inner race and said outer race in a rolling contact relation; and
a hydrodynamic foil bearing element including a plurality of resilient bearing foils mounted within the shaft receiving opening around the outer race of said rolling contact bearing element and substantially preventing rolling contact bearing action above a certain rotation between said rotatable shaft and said bearing support member.

16. A hybrid bearing comprising:
a bearing support member having an opening to receive a rotating shaft;
a rotatable shaft received within the opening in said bearing support member;
a rolling contact bearing element mounted upon said rotatable shaft within the shaft receiving opening in said bearing support member, said rolling contact bearing element including an outer race, an inner race, and a rolling member positioned between said inner race and said outer race in a rolling contact relation;
a foil bearing element mounted within the shaft receiving opening around the outer race of said rolling contact bearing element; and
clutch means operably associated with said rolling contact bearing element to prevent relative rotation of the inner race with respect to the outer race above a predetermined shaft rotational speed.

17. The hybrid bearing of claim 16 wherein said clutch means is centrifugally actuated.

18. The hybrid bearing of claim 17 wherein said centrifugally actuated clutch means comprises a flexible member mounted upon the inner race of said rolling contact bearing element, a brake pad mounted upon the outer race of said rolling contact bearing element, and a weight mounted upon said flexible member to contact said brake pad above a predetermined shaft rotational speed.

19. The hybrid bearing of claim 18 wherein said clutch means includes means to adjust said clutch means to be actuated at varying predetermined shaft rotational speeds.

20. A hybrid bearing comprising:
a bearing support member having an opening to receive a rotating shaft;
a rotatable shaft received within the opening in said bearing support member;
a rolling contact bearing element mounted upon said rotating shaft within the opening in said bearing support member, said rolling contact bearing element including an outer race, an inner race, and a rolling member interposed therebetween in a rolling contact relation, said inner race rotating with said shaft and said outer race stationary with said bushing at shaft rotational speeds below a predetermine value;
a foil bearing element mounted within the shaft receiving opening around the outer race of said rolling contact bearing element; and
clutch means to prevent relative rotation between the inner race and the outer race of said rolling contact bearing element above a predetermined shaft rotational speed whereby said outer race rotates with said shaft and hydrodynamic bearing films are generated between the outer race and said foil bearing element.

21. The hybrid bearing of claim 20 wherein said clutch means is centrifugally actuated.

22. A hybrid bearing comprising:
a first member and a second member arranged for relative movement with respect to each other, one of said members being adapted to support the other;
a rolling contact bearing disposed between said first member and said second member, said rolling contact bearing comprising a first race, a second race, and a rolling member disposed between said first and second races in a rolling contact relation, said first race secured to said first member; and
a hydrodynamic foil bearing element disposed between said second race and said second member, said foil bearing element fixedly secured to said second race to move with said second member and said second race with respect to said first race and said first member, rollably through said rolling member, below a certain relative movement between said first and second members where the rolling friction between said first and second races is less than the friction between the foil bearing and said second member, said second member to move hydrodynamically with respect to said foil bearing element, said rolling contact bearing and said first member above a certain relative movement between said first and second members where the friction between said foil bearing element and said second member is less than the rolling friction between said first and second races and thus substantially preventing rolling contact bearing action.

23. The hybrid bearing of claim 22 wherein said first member and said second member are a bushing and shaft arranged for relative rotation with respect to each other and said first race and said second race are substantially cylindrical and concentrically arranged around said rolling member.

24. The hybrid bearing of claim 23 wherein said foil bearing element includes a plurality of resilient bearing foils secured inside the second race of said rolling contact bearing and concentrically arranged about said shaft, said resilient bearing foils preloaded to increase the friction between the resilient bearing foils and said shaft to prevent relative rotation between the resilient bearing foils and said shaft below a preselected relative rotation between said bushing and said shaft.

25. A hybrid bearing comprising:
a first member and a second member arranged for relative movement with respect to each other, one of said members being adapted to support the other;
a rolling contact bearing disposed between said first member and said second member, said rolling contact bearing comprising a first race, a second race, and a rolling member disposed between said first and second races in a rolling contact relation, said first race secured to said first member; and
a hydrodynamic foil bearing element disposed between said second race and said second member, said foil bearing element fixedly secured to said second member to move with said second member and said second race with respect to said first race and said first member, rollably through said rolling member, below a certain relative movement between said first and second members where the rolling friction between said first and second races is less than the friction between the foil bearing and said second race, said second member and said foil bearing element to move hydrodynamically with respect to said rolling contact bearing and said first member above a certain relative movement between said first and second members and substantially preventing rolling contact bearing action where the friction between said foil bearing element and said second race is less than the rolling friction between said first and second races.

26. A hybrid bearing comprising:
a bearing support member having an opening to receive a rotating shaft;
a rotatable shaft disposed within the opening in said bearing support member;

a rolling contact bearing disposed within the opening in said bearing support member around said rotatable shaft, said rolling contact bearing comprising concentrically arranged inner and outer races disposed around a plurality of rolling elements, and said outer race secured to the bearing support member; and a hydrodynamic foil bearing disposed between the rotatable shaft and the inner race of said rolling contact bearing, said hydrodynamic foil bearing including a plurality of resilient bearing foils fixedly secured to the inner race concentrically around the rotatable shaft;

the rolling contact bearing friction between said inner and outer races and the plurality of rolling elements being less than the friction between the rotatable shaft and the hydrodynamic resilient bearing foils below a certain relative rotation between the shaft and bearing support member such that the shaft, hydrodynamic foil bearing, and the inner race all rotate together with respect to the outer race and bearing support member below this certain relative rotation, the rolling contact bearing friction between said inner and outer races and the plurality of rolling elements increasing as the relative rotation between the shaft and bearing support member increases until above the certain relative rotation the rolling contact bearing friction becomes greater than the bearing friction between the rotatable shaft and the hydrodynamic resilient bearing foils such that the shaft then rotates with respect to the hydrodynamic foil bearing, the rolling contact bearing and the bearing support member, the inner race substantially no longer rotating with respect to the outer race above this certain relative rotation between the shaft and the bearing support member.

27. A hybrid bearing comprising:

a bearing support member having an opening to receive a rotating shaft;

a rotatable shaft disposed within the opening in said bearing support member;

a rolling contact bearing disposed within the opening in said bearing support member around said rotatable shaft, said rolling contact bearing comprising concentrically arranged inner and outer races disposed around a plurality of rolling elements, said inner race secured around the rotatable shaft; and a hydrodynamic foil bearing disposed between the outer race of said rolling contact bearing and the bearing support member, said hydrodynamic foil bearing including a plurality of resilient bearing foils secured in the opening in said bearing support member concentrically around the outer race of the rolling contact bearing;

the rolling contact bearing friction between said inner and outer races and the plurality of rolling elements being less than the bearing friction between and outer race and the hydrodynamic resilient bearing foils below a certain relative rotation between the shaft and the bearing support member such that the shaft and the inner race rotate together with respect to the outer race, hydrodynamic foil bearing, and bearing support member below this certain relative rotation, the rolling contact bearing friction between the inner and outer races and the plurality of rolling elements increasing as the relative rotation between the shaft and bearing support member increases until above the certain relative rotation the rolling contact bearing friction becomes greater than the bearing friction between the outer race and the hydrodynamic resilient bearing foils such that the shaft and rolling contact bearing then together rotate with respect to the hydrodynamic foil bearing and the bearing support member, the inner race substantially no longer rotating with respect to the outer race above this certain relative rotation between the shaft and the bearing support member.

28. A method of supporting relative rotation between a shaft and a bushing comprising:

providing a rolling contact bearing having a concentrically arranged inner race, rolling elements, and outer race between the shaft and the bushing;

providing a hydrodynamic foil bearing including a plurality of resilient bearing foils between the inner race of the rolling contact bearing and the shaft;

relatively rollably rotating, through the rolling elements, the shaft, hydrodynamic foil bearing, and the inner race with respect to the outer race and the bushing below a certain relative rotation between the shaft and bushing;

relatively hydrodynamically rotating the shaft with respect to the hydrodynamic bearing foils, the rolling contact bearing, and the bushing above a certain relative rotation between the shaft and bushing at which relative rotation the inner and outer races of the rolling contact bearings do not substantially rotate with.

29. A method of supporting relative rotation between a shaft and a bushing comprising:

providing a rolling contact bearing having a concentrically arranged inner race, rolling elements, and outer race between the shaft and the bushing;

providing a hydrodynamic foil bearing including a plurality of resilient bearing foils between the outer race of the rolling contact bearing and the bushing;

relatively rollably rotating, through the rolling elements, the shaft and the inner race with respect to the outer race, hydrodynamic foil bearing, and the bushing below a certain relative rotation between the shaft and bushing;

relatively hydrodynamically rotating the shaft and rolling contact bearing with respect to the hydrodynamic bearing foils and the bushing above a certain relative rotation between the shaft and bushing at which relative rotation the inner and outer races of the rolling contact bearing do not substantially rotate.

* * * * *

UNITED STATES PATENT OFFICE
CERTIFICATE OF CORRECTION

Patent No. 3,642,331          Dated February 15, 1972

Inventor(s) Alexander Silver

It is certified that error appears in the above-identified patent and that said Letters Patent are hereby corrected as shown below:

Claim 1, lines 12-13, delete "-has been inserted"

Claim 2, lines 12-13, delete "-has been inserted"

Claim 10, lines 14-15, delete "-has been inserted"

Claim 28, line 18, delete "with"

Signed and sealed this 27th day of June 1972.

(SEAL)
Attest:

EDWARD M. FLETCHER, JR.        ROBERT GOTTSCHALK
Attesting Officer               Commissioner of Patents